April 29, 1952     M. A. CHAVANNES     2,594,290
APPARATUS FOR APPLYING DESIGNS
TO PLASTIC SHEETLIKE MATERIALS Filed Jan. 29, 1947     2 SHEETS—SHEET 1

INVENTOR.
MARC A. CHAVANNES
BY
ATTORNEY

April 29, 1952 M. A. CHAVANNES 2,594,290
APPARATUS FOR APPLYING DESIGNS
TO PLASTIC SHEETLIKE MATERIALS
Filed Jan. 29, 1947 2 SHEETS—SHEET 2

INVENTOR.
MARC A. CHAVANNES
BY
ATTORNEY

Patented Apr. 29, 1952

2,594,290

UNITED STATES PATENT OFFICE 2,594,290

APPARATUS FOR APPLYING DESIGNS TO PLASTIC SHEETLIKE MATERIALS

Marc A. Chavannes, Lisbon, Conn., assignor to Chavannes Industrial Synthetics, Inc., New York, N. Y., a corporation of Delaware Application January 29, 1947, Serial No. 725,110

5 Claims. (Cl. 154—97.5)

The present invention relates to apparatus and a method for printing or applying decorative designs to film or preformed calendered sheeting of plastic material, and the like.

Prior to the present invention, considerable difficulty has been encountered in attempts to print designs on plastic film, and one reason for such difficulties has been that solvents of the printing ink used usually have a tendency to attack the sheeting, causing same to buckle when it is advanced under tension.

An object of the present invention is to provide apparatus and a method for producing printed patterns in any desired number of colors on such sheet-like material, without smearing, buckling or other undesirable effects.

Figure 1:
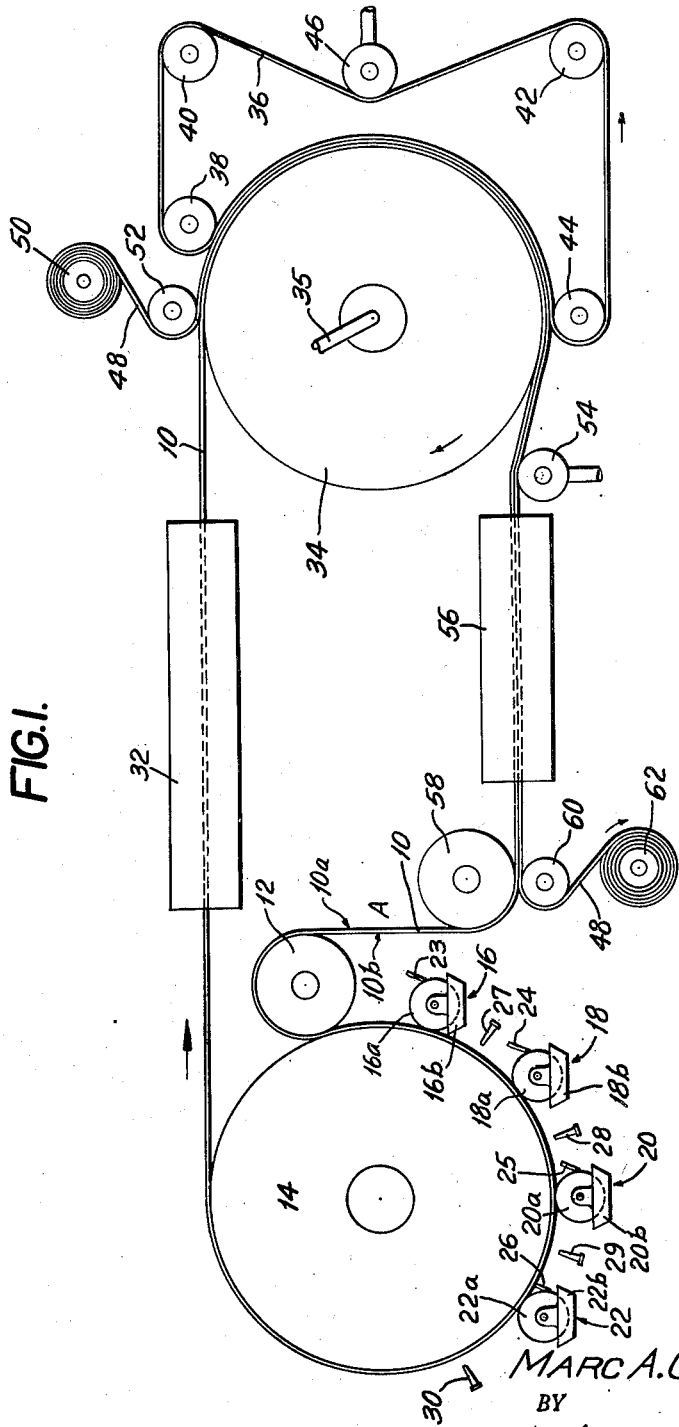
Fig. 1 is a schematic side elevational view of a first embodiment of apparatus for accomplishing such printing, employing an endless conveyor belt.

In Fig. 1 there is provided an endless conveyor belt 10, comprising a metallic layer indicated at 10a and a layer of rubber or the like, indicated at 10b. From station A, which may be considered the starting point, this belt passes over a guide roller 12, and then around a large drum 14, the rubber layer being on the outer side. The purpose of the rubber layer is to provide a surface to which ink may readily be applied and from which it may readily be stripped later in the process, when dried.

Cooperating with said drum and located in spaced relation to each other are a plurality of fountains, 16, 18, 20 and 22, comprising a series of engraved rotogravure rollers, 16a, 18a, 20a and 22a and a series of troughs 16b, 18b, 20b and 22b, respectively. The troughs respectively hold differently colored inks. These inks may in the present example be assumed to be thermoplastic. The rollers may each be engraved with a pattern, for example, a half-tone effect, being adapted to apply many small dots of ink to the conveyor belt in accordance with the desired pattern. The rollers may be provided with doctor blades, 23, 24, 25 and 26, respectively. Provision is made for surface drying the ink on the conveyor after it leaves one fountain and before it reaches the next one sufficiently to avoid smearing, but the drying need not necessarily be complete. For this purpose there may be provided air ducts 27, 28, 29 and 30, respectively, following the rollers, adapted to blow warm air onto the conveyor. The last one may be omitted if desired. If the fountains are sufficiently separated, the others may be omitted as well.

The conveyor belt bearing the ink is then passed through a drying oven 32, where the ink is thoroughly dried. The temperature in this oven should preferably be lower than the boiling point of solvents used in the ink.

There is provided a large heated drum 34, and a pressure belt 36 cooperating therewith. Steam may be supplied to the interior of the drum 34 by a pipe 35, or other means may be employed for heating same. The pressure belt 36 may be of any strong, flexible heat-resisting material, such as of stainless steel. It could also be of felt. It need not be of a double-layer construction like the belt 10. The pressure belt 36 may be carried by a series of guide rollers 38, 40, 42 and 44, and a tensioning roller 46. The drum 34 may be driven, by means not shown, in a clockwise direction. The belt 36 may idle on its rollers, or means not shown may be provided for positively driving the roller 44 in a counterclockwise direction at a speed to advance the belt 36 at the same linear rate as the belt 10.

The film or sheeting 48 which is to be printed may be carried by a reel 50. In the present example the film may be assumed to be thermoplastic. It is drawn from this reel and then passes over a guide roller 52. After leaving this roller it passes around the drum 34 between the conveyor belt 10 and the pressure belt 36. Here the thermoplastic ink design and film 48 are bonded together by heat and pressure. It may be noted that the heat and pressure are applied throughout an extended zone as the film and design pass therethrough. An important feature is that this zone may be considered to comprise a heating zone and a bonding zone. The heating zone proper in Fig. 1 may be considered to include the arcuate region surrounding the first position of the roller 34 around which the conveyor passes and the bonding zone may be considered to include the arcuate region surrounding the portion of the roller 34 around which the conveyor later passes. The two zones overlap or coincide to some extent in this embodiment. In the present illustration both heat and pressure are applied in both the heating and bonding zones, but the primary function of the heating zone is to render the film and ink adhesive one to the other by the application of heat, while the primary function of the bonding zone is actually to bond them together. It is important that after the film and ink are made tacky by thorough heating in the heating zone, pressure be exerted in the bonding zone for a long enough time to effect a satisfactory bond.

After leaving the drum 34 the conveyor belt 10 passes over another tensioning roller 54 and passes through a cooling compartment 56. In case rapid operation is desired, the compartment 56 may be refrigerated. If the operation proceeds more slowly, however, it may be at room temperature. The belt 10 then passes between a pair of guiding and stripping rollers 58 and 60, where the film, together with the ink design now fused therewith, is stripped from the conveyor belt. The film 48 is wound up on a reel 62, and the conveyor returns to station A, where it started.

Figure 2:
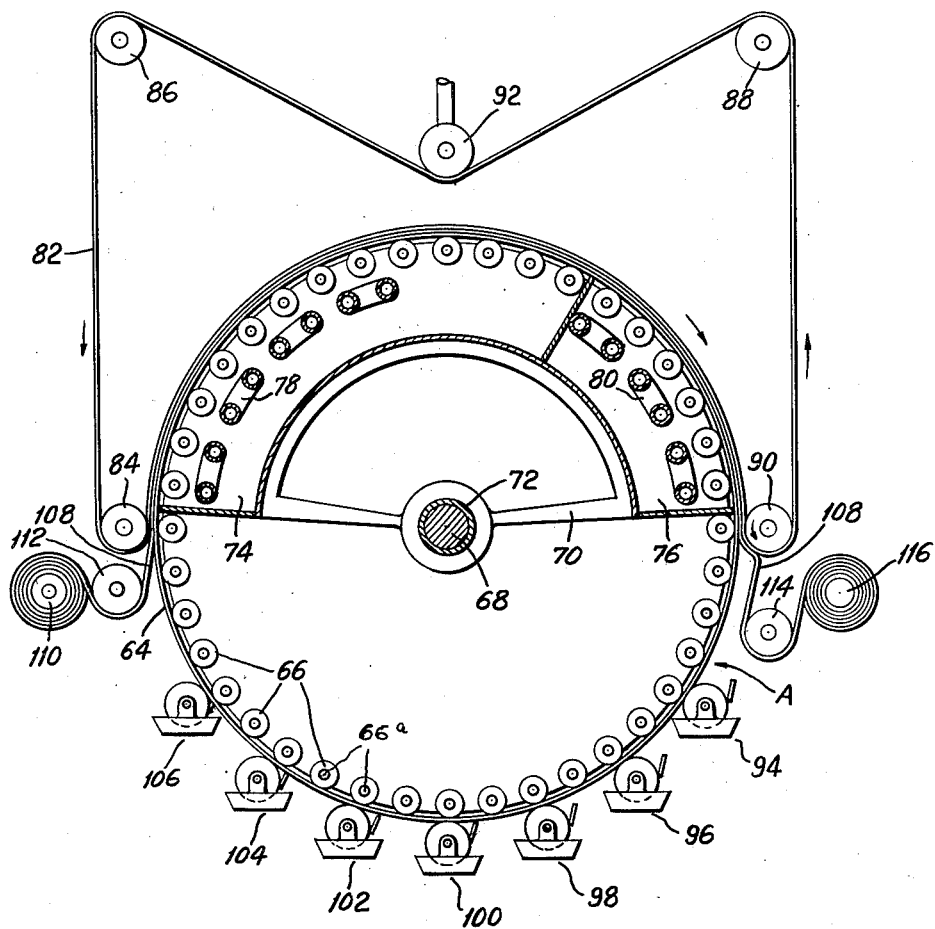
Fig. 2 is a somewhat different embodiment of apparatus having the same purpose, wherein the conveyor belt is in a generally cylindrical shape.

The embodiment shown in Fig. 2 employs a conveyor belt 64, which may be of the same type as 10, previously described, but which is supported by a series of rollers 66 having stationary axes 66a arranged in a generally cylindrical configuration. The rollers in turn are supported from a stationary frame, not shown, which carries a stationary shaft 68, axial of the conveyor. Supported by this shaft is a stationary frame 70, having a hub 72, and mounted on the frame 70 is a stationary heating compartment 74 and a cooling compartment 76. The heating compartment may be supplied with steam through coils 78, and the cooling compartment may be supplied with refrigerant through coils 80.

The heating and cooling compartments and the frame which supports the rollers 66 are provided with openings, not shown, through which the coils 78 and 80 may pass in order to enter and leave the heating and cooling compartments.

There is provided a pressure belt 82, guided by a series of rollers 84, 86, 88 and 90, and a tensioning roller 92. One of these rollers, such as roller 90, may be positively driven in a counterclockwise direction and adapted to advance the belt 82. The belt in turn serves to advance the belt 64 in a clockwise direction as will be described at a later point.

The operation may be considered to start at station A, where the outer, rubber-coated surface of the belt 64 is clean, no ink having yet been applied thereto at that point. The belt first passes over a series of fountains 94–106, adapted to apply a multicolored design of ink to the belt 64. Air ducts, not shown, may be provided following each fountain for drying the ink at least partly.

The film 108 may be carried by a reel 110 from which it is drawn, thereafter passing under a guide roller 112. It then passes between the belt 64 and the belt 82, being advanced in a generally left-to-right or clockwise direction. The belt 82 presses the film 108 against the belt 64 guided by the rollers 66, and the friction is great enough that the belt 82 drives the film 108 and belt 64, as desired.

The heating compartment 74 provides, immediately outside it, an extended arcuate zone where the film 108 and the ink design are heated and pressed together, becoming bonded one to the other. A cooling zone is provided outside the cooling compartment 76. In this zone the film and ink become somewhat more firm before the stripping operation takes place. As shown, the film 108 together with the design is stripped from the belt 82 as they pass around the roller 90, the film then passing around a guide roller 114 and being wound upon a reel 116.

The film mentioned above might satisfactorily be, for example, of a copolymer of vinyl acetate and vinyl chloride, and it might be formed by calendering or by casting from a dispersion or solution. The ink might satisfactorily be, for example, a solution of a copolymer of vinyl acetate and vinyl chloride, along with a plasticizer, a pigment or dye, and a solvent.

It is preferable that both the film and the ink be thermoplastic, in order that when they are pressed together under heat and pressure, a firm bond may be obtained. In some cases, however, a film of thermoplastic material may be used in conjunction with an ink of another type of material, such as a thermosetting material. It is theoretically possible to use a thermoplastic ink with a non-thermoplastic film. In any case, however, it is necessary that either the film or the ink be thermoplastic, and it is necessary that sufficient heat be applied to soften one of the substances and render it tacky so that it will become bonded to the other.

By using the apparatus and method described above to apply designs to film, accurate registration of multicolored designs may be obtained, and the designs are permanently bonded to the film.

While a suitable form of apparatus and mode of procedure, to be used in accordance with the invention have been described in some detail, and certain modifications have been suggested, it will be understood that numerous changes may be made without departing from the general principles and scope of the invention.

I claim:

1. Apparatus for applying printed designs to thermoplastic film comprising a conveyor, said conveyor comprising an endless belt presenting a surface of yielding material on which designs of thermoplastic ink may be printed and from which said designs may readily be stripped when dried, printing means comprising at least one printing roller adapted to apply a plurality of separate designs of thermoplastic ink to said conveyor, ink-drying means, means for applying said film to said conveyor over the dried ink, means for advancing said film and said conveyor together through an extended zone, a pressure belt, means for pressing said belt against said film and said conveyor as they advance through said zone, means for heating said film and said ink as they pass through a considerable portion of said zone, whereby said ink becomes bonded to said film, and means for stripping said film bearing said ink from said conveyor.

2. Apparatus for applying printed designs to a thermoplastic web comprising a conveyor, said conveyor comprising an endless belt presenting a surface of yielding material on which designs may be printed in a liquid thermoplastic ink and from which said thermoplastic ink may readily be stripped when dry, printing means comprising a plurality of printing rollers having discontinuous surfaces adapted to apply a pattern of fluid ink to said surface on said conveyor, ink drying means between said rollers, means for applying a web of thermoplastic material in face-wise contact with said dried ink upon said conveyor and advancing said web and said conveyor together through an extended area, a pressure belt, means for pressing said belt against said film and said conveyor as they advance through said area, means for heating said film and said ink as they pass through a considerable portion of said area to a temperature such as to render said film and said ink sufficiently plastic to be bonded together under the pressure applied in said area, and means for stripping said film and said ink pattern from said conveyor.

3. Apparatus for decorating thermoplastic film comprising an endless conveyor belt, a first drum around which said belt passes, means for applying a design of thermoplastic ink to said belt as it passes around said drum, means for drying said ink, a second drum around which said conveyor belt passes, a pressure belt adapted to be pressed against said conveyor belt and to be advanced while in contact with same through an extended arc as it passes around said second drum, means for feeding said film between said conveyor belt and said pressure belt, means for heating said film and said ink while they are pressed together while they pass around said second drum to create a permanent bond between same, and means for stripping said film together with said ink from said conveyor belt.

4. Apparatus for decorating thermoplastic film comprising a series of rollers having their axes lying in a generally cylindrical configuration, a conveyor belt arranged in a generally cylindrical configuration passing outside said rollers and adapted to be rotated on same, printing means for applying a thermoplastic ink to spaced areas of said conveyor belt, means for applying said film in face-wise engagement to said conveyor bearing said ink, means for heating said film and said ink sufficiently to cause them to adhere to one another, a pressure belt adapted to press the heated film against said conveyor through an extended arc, and means for stripping said film together with said ink from said conveyor and said pressure belt.

5. Apparatus for decorating thermoplastic film comprising a series of rollers having their axes supported in fixed positions and arranged in a generally cylindrical configuration, an endless conveyor belt passing outside said rollers and adapted to be rotated on same, a first stationary arcuate compartment extending partly around the interior of said belt and said rollers, means adapted to heat said compartment, a second stationary arcuate compartment extending partly around the interior of said belt and said rollers in another region, means adapted to cool said second compartment, a plurality of printing means spaced around the outside of a portion of said belt adapted to apply multicolored designs of thermoplastic ink thereto, a movable pressure belt and means guiding and pressing same toward the outer surface of said conveyor belt through and arc subtending a considerable portion of each of said compartments, means for feeding a thermoplastic film between said pressure belt and said conveyor belt, whereby said film becomes bonded to said ink on said conveyor belt, and means for reeling up said film together with said ink thereon after they have passed between said pressure belt and said conveyor belt.

MARC A. CHAVANNES.

REFERENCES CITED

The following references are of record in the file of this patent:

UNITED STATES PATENTS

| Number | Name | Date |
| --- | --- | --- |
| 1,086,400 | Richardson | Feb. 10, 1914 |
| 1,283,315 | Rosenfeld | Oct. 29, 1918 |
| 1,641,173 | Ladd et al. | Sept. 6, 1927 |
| 2,219,829 | Teague et al. | Oct. 29, 1940 |
| 2,255,953 | Vergobbi | Sept. 16, 1941 |
| 2,404,073 | Karfiol et al. | July 16, 1946 |
| 2,485,725 | Francis | Oct. 25, 1949 |